July 26, 1938.  A. J. WILLIAMS, JR., ET AL  2,124,725
ELECTRICAL GENERATING SYSTEM
Filed June 19, 1935  7 Sheets-Sheet 1

Inventors
Albert J. Williams Jr. and
Stephen B. Morehouse
By Cornelius D. Ehret
Attorney July 26, 1938.  A. J. WILLIAMS, JR., ET AL  2,124,725
ELECTRICAL GENERATING SYSTEM
Filed June 19, 1935   7 Sheets-Sheet 2

Inventors
Albert J. Williams Jr. and
Stephen B. Morehouse
By Cornelius D. Ehret
Attorney.

Inventors
Albert J. Williams Jr. and
Stephen B. Morehouse
By Cornelius D. Ehret
Attorney.

July 26, 1938.  A. J. WILLIAMS, JR., ET AL  2,124,725
ELECTRICAL GENERATING SYSTEM
Filed June 19, 1935    7 Sheets-Sheet 6

Inventors
Albert J. Williams Jr. and
Stephen B. Morehouse
By Cornelius L. Ehret
Attorney

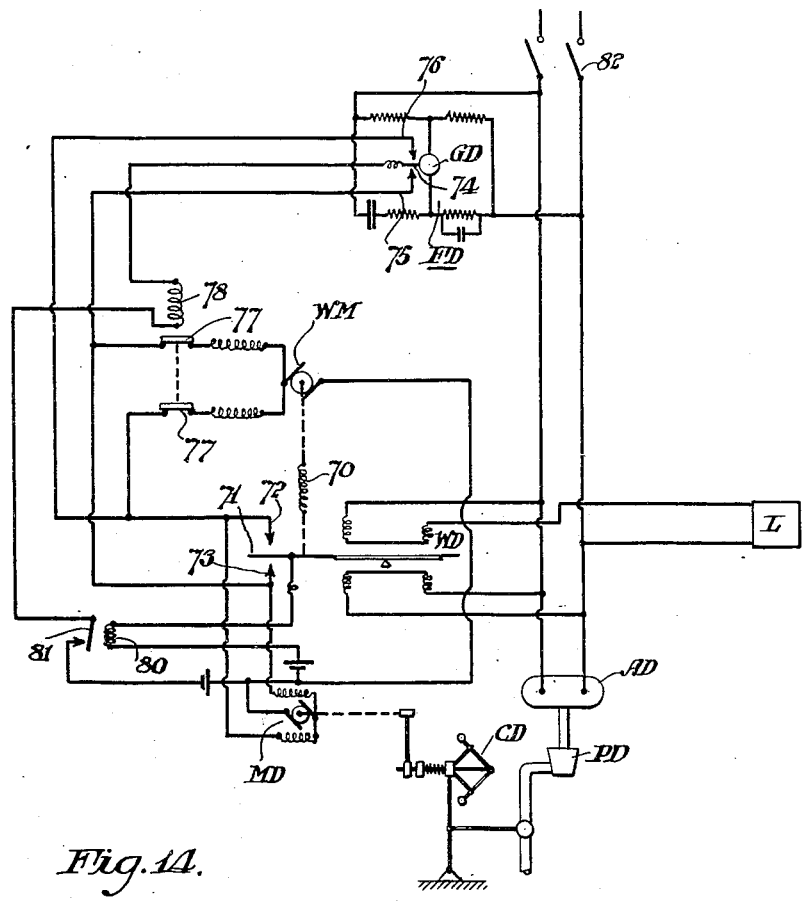

Patented July 26, 1938

2,124,725

UNITED STATES PATENT OFFICE 2,124,725

ELECTRICAL GENERATING SYSTEM

Albert J. Williams, Jr., and Stephen B. Morehouse, Philadelphia, Pa., assignors to Leeds & Northrup Company, Philadelphia, Pa., a corporation of Pennsylvania Application June 19, 1935, Serial No. 27,326

39 Claims. (Cl. 171—119)

Our invention relates to electrical power systems, and particularly to methods of and apparatus for controlling the frequency of or the distribution of load between generators, generator groups or generating stations, interconnected by one or more tie lines.

In accordance with our invention, individual stations, each having one or more generators, of the system are equipped with control apparatus which causes each of them quickly to change load in response to changes in system frequency to share in the maintenance of system frequency, and which, by a slower control action, maintains the tie line loads at predetermined magnitudes.

More particularly, each of the aforesaid stations, having one or more generating units, is provided with a frequency responsive network which is normally balanced at the desired system frequency, and which when unbalanced is effective to change the input to the generator or generators in proper sense to restore system frequency, and, in addition, is provided with means responsive to departure of the tie line load from a desired magnitude for unbalancing the aforesaid network of the station to effect change of the generator input thereat, to restore the tie line load to the predetermined magnitude.

Further, in accordance with our invention, one of the stations of the system is selected as a central station, and each of the remainder of the stations is controlled, as aforesaid, in response to changes in system frequency and the load current in the tie line connecting it directly, or through another station or stations toward the central station; more specifically, those stations having one or more tie lines extending towards the central station and one or more tie lines towards outlying stations are so controlled as to maintain at the desired magnitude the load on the tie line or tie lines extending towards the central station.

Also in accordance with our invention, one or more of the stations may be provided with control apparatus for varying the input in response to changes in system frequency so long as the load changes are small, or large but slow, and which more rapidly varies the input in response to large sudden changes in load.

Our invention further resides in the methods and arrangements hereinafter described and claimed.

For an understanding of our invention, reference is made to the accompanying drawings, in which:

Figure 1 diagrammatically illustrates a supply system comprising a plurality of stations;

Fig. 2 diagrammatically illustrates the control system for one of the stations of Fig. 1;

Fig. 3, in perspective, shows essential parts of a control mechanism utilized in the system of Fig. 2;

Fig. 4 schematically illustrates a load-responsive control device used in the system of Fig. 1;

Figure 6:
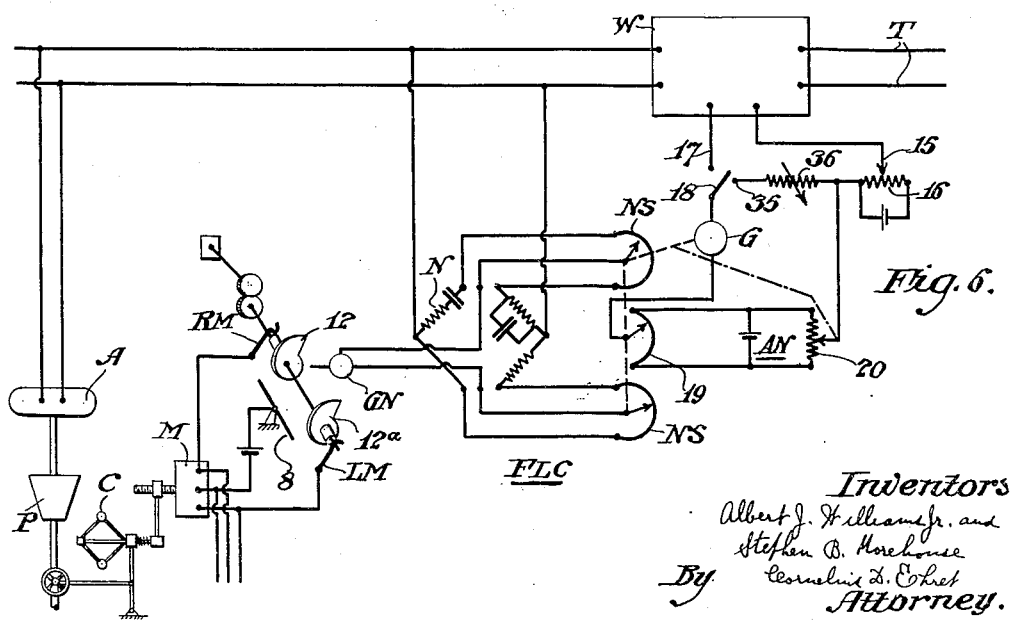
Fig. 6 illustrates diagrammatically a control system as used for each of several stations of Fig. 1.
Figure 7:
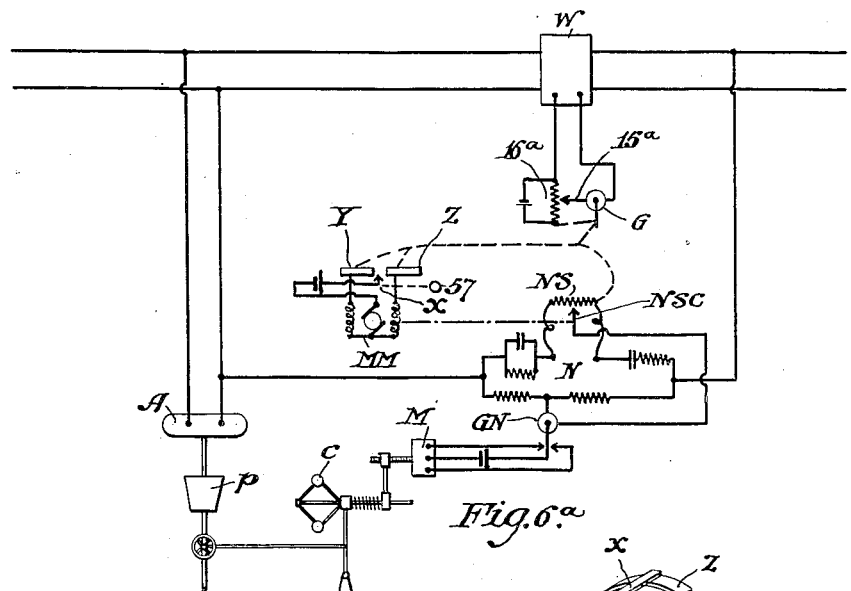
Figure 7:
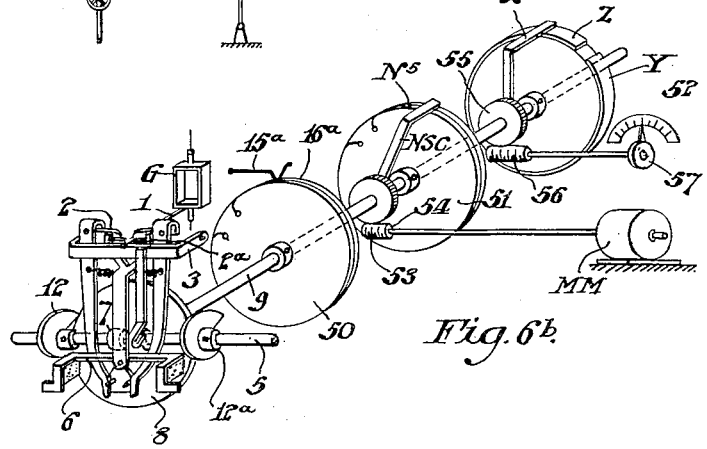
Figure 7:
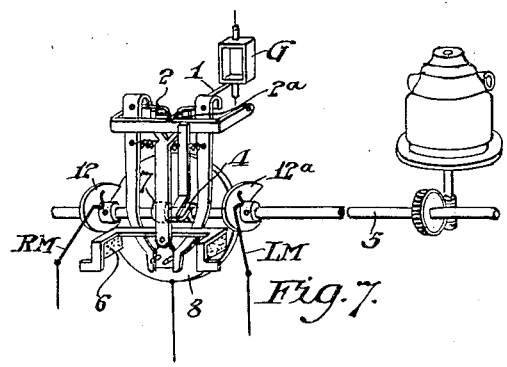
Figure 8:
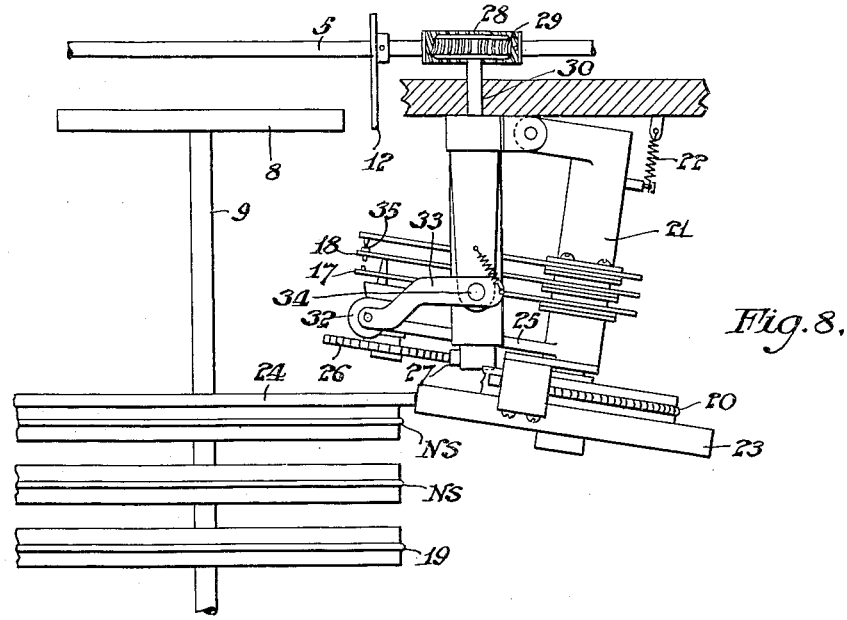
Figure 9:
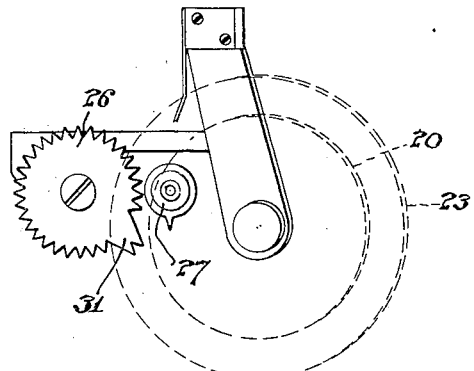
Figure 10:
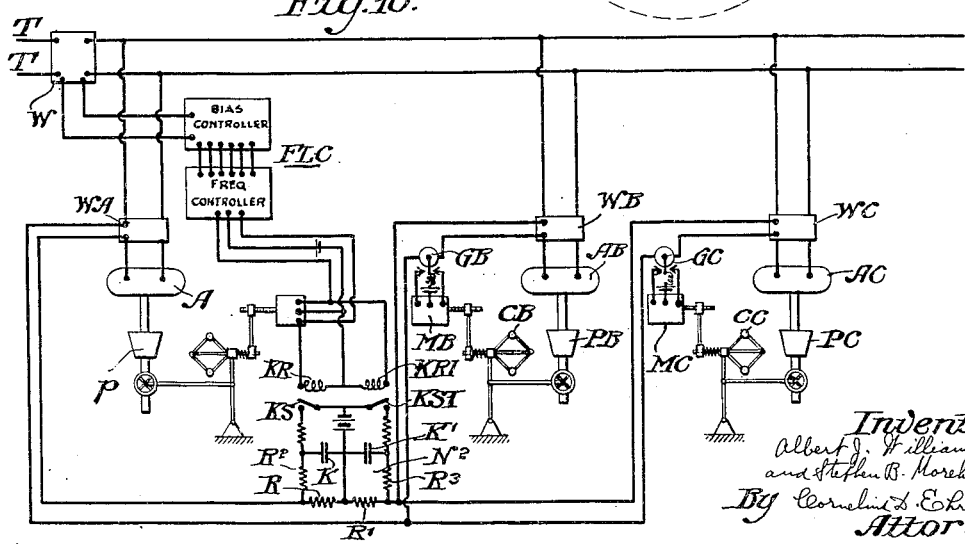
Figure 11:
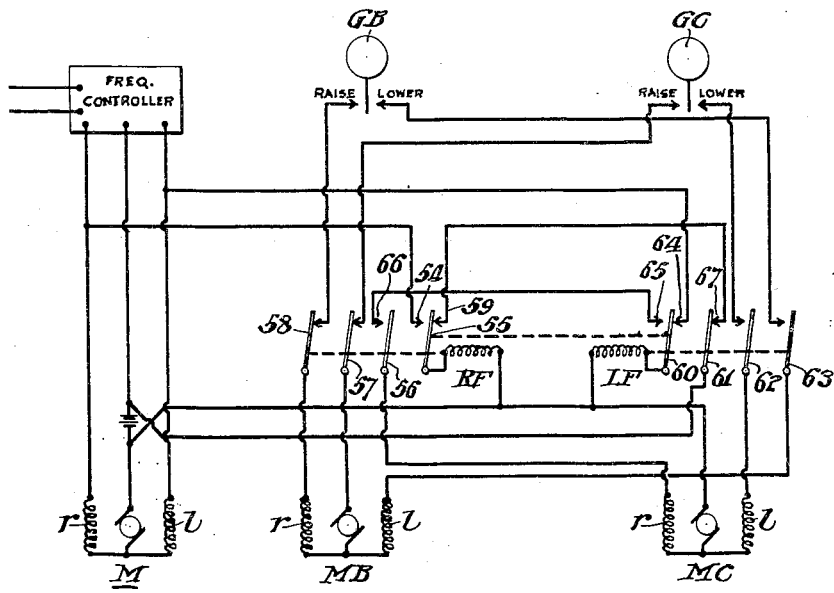
Figure 11:
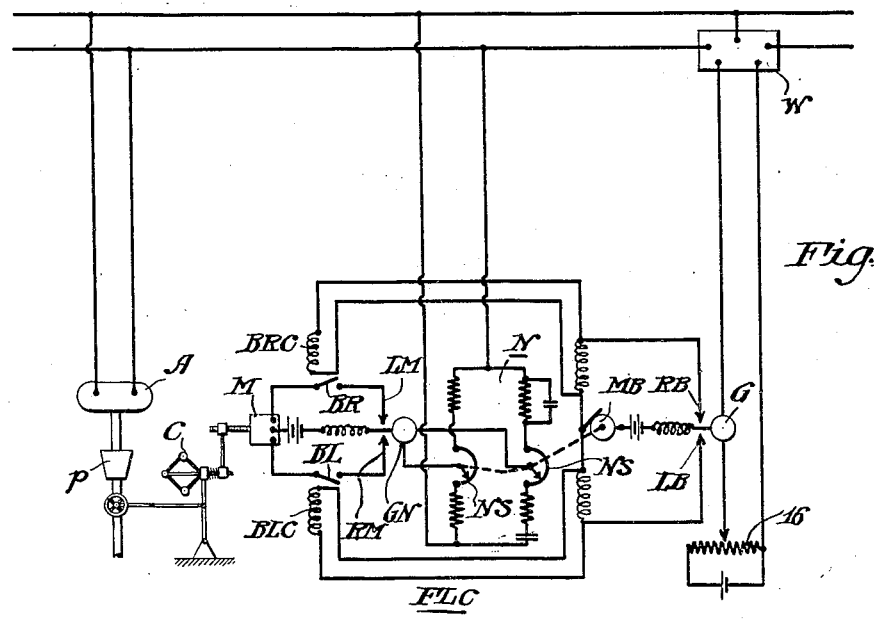
Figure 12:
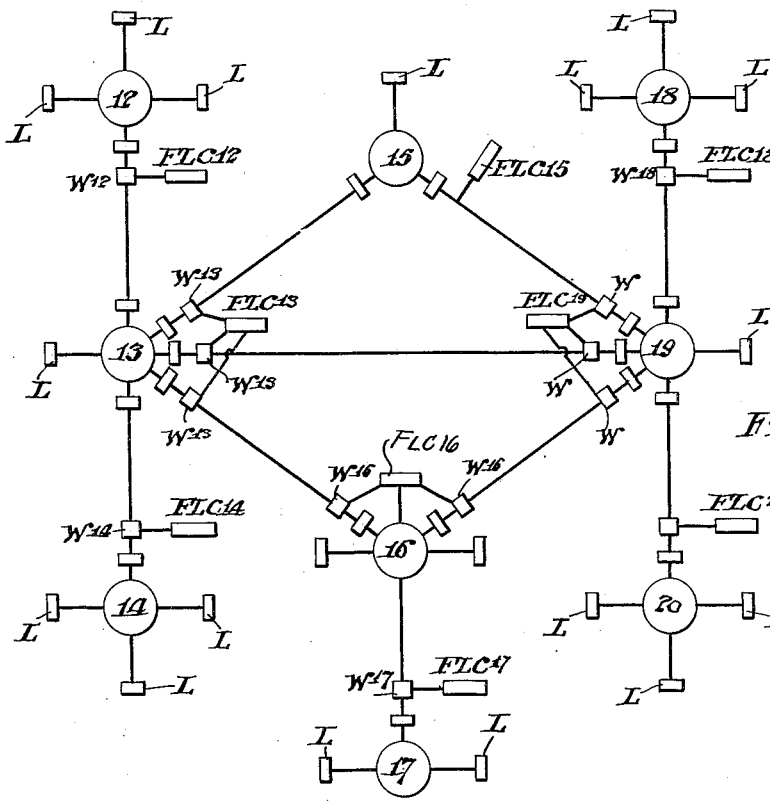
Figure 13:
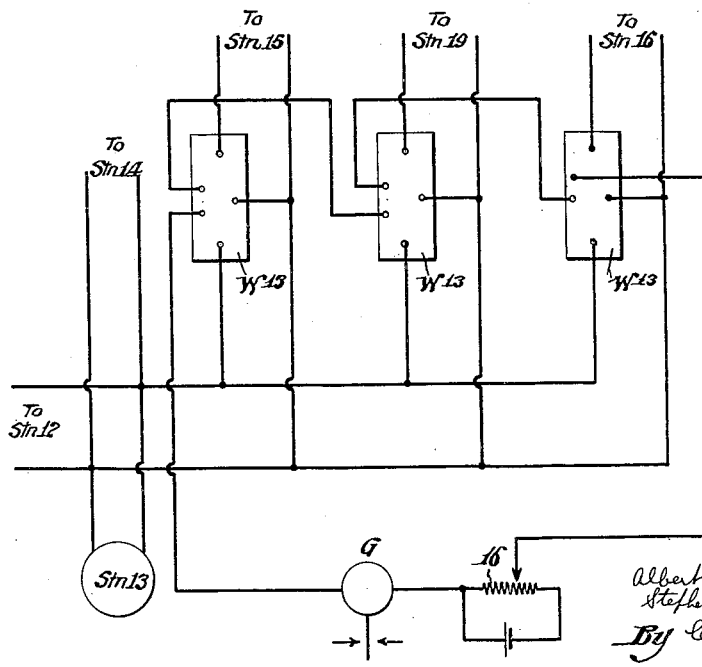

Fig. 6a diagrammatically illustrates a modification of the control system of Fig. 6;

Fig. 6b is a perspective view of control apparatus used in the system of Fig. 6a;

Fig. 7, in perspective, shows a control device used in the system of Fig. 6;

Fig. 8 is a plan view of elements of a control device used in the system of Fig. 6;

Fig. 9 is an elevational view of parts appearing in Fig. 8;

Fig. 10 diagrammatically illustrates a control system for controlling the load distribution between generators of a station;

Fig. 10a shows a relay circuit for inclusion in the control system of Fig. 10;

Fig. 11 is a modification of the system shown in Fig. 6;

Fig. 12 diagrammatically illustrates another power supply network;

Fig. 13 illustrates a control circuit used for certain stations of the system of Fig. 12;

Fig. 14 illustrates another modification.

Figure 1:
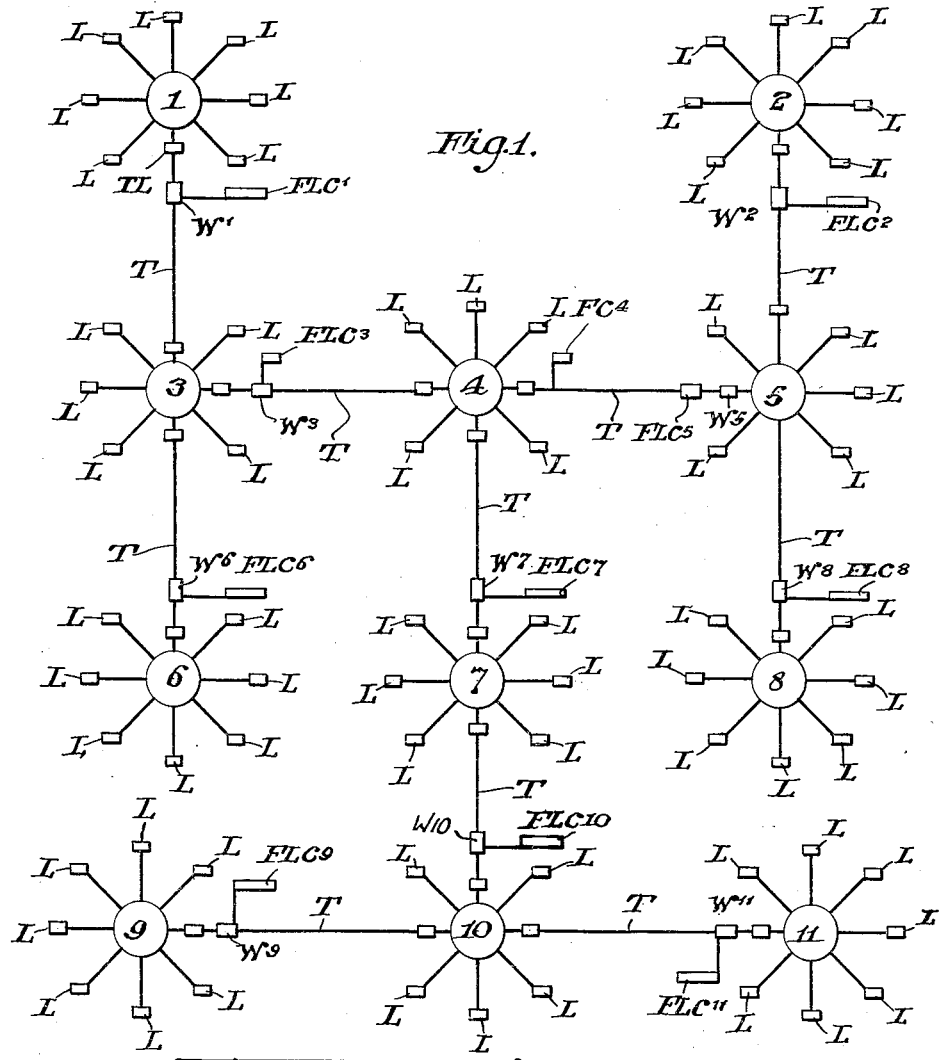

Referring to Fig. 1, the stations #1-3 and #5-11 each supply their individual loads L, and are connected by tie lines T to the system to receive or supply power thereto, usually in accordance with an agreement or contract to purchase or sell power to the system. The tie line load of each of these stations is regulated by a controller FLC, whose construction and operation is hereinafter more specifically described, which maintains the tie line load, toward the master station, for each of the stations at the desired value and, in addition, as will hereinafter appear, the controllers FLC1—FLC11 are of such nature that all of them respond to a change in system frequency so that all stations contribute to the maintenance of system frequency. Station #4, which has been selected as the central station, although any one of the stations may be selected as the central station, does not require a tie line load controller and is therefore free to control any other system condition. For example, the central station may be controlled to maintain the integrated system frequency constant by provision of any suitable control arrangement, for example, such as shown in Heath Reissue Patent No. 19,157, or it may be provided with a control arrangement such as shown in Fig. 2 hereof, corresponding to Wunsch Patent No. 1,751,539 for controlling the instantaneous frequency.

Figure 2:
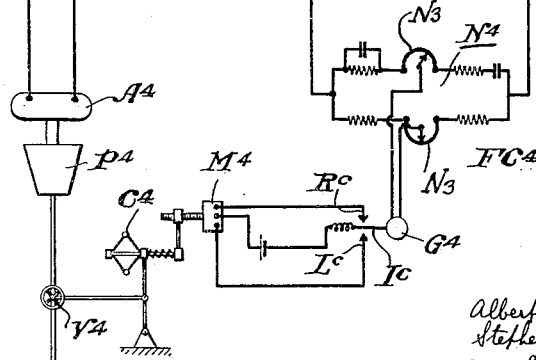

Referring to Fig. 2 which illustrates the Wunsch control system, per se, the alternator A4 is driven by the prime mover P4 which may be, for example, a steam or hydraulic turbine, whose input valve V4 is controlled by the centrifugal governor C4. The setting of the governor, or the force of its biasing spring, is controlled by the pilot motor M4. The energization and sense of rotation of the motor M4 is controlled by the galvanometer G4 which is included in the frequency-responsive network N4. Upon a change in system frequency the network is unbalanced, and the galvanometer G4 responds, energizing the pilot motor to change the governor setting or in any other suitable manner to change the generator input in the proper sense to restore system frequency.

A preferred control device for controlling the energization of motor M4 in response to deflections of galvanometer G4 is shown in Fig. 7. The mechanism of Fig. 7 is fully disclosed and described in Doyle Patent No. 1,918,021 (Fig. 6), hence the description herein is brief. When coil G, in response to unbalance of the frequency-bridge N4, deflects from neutral position, the galvanometer pointer 1 passes beneath one or the other of the pivoted arms 2, 2a, so that when bar 3 is raised by cam 4 on the continuously rotating shaft 5, the arm 2 or 2a is swung about its pivot to rock the member 6 from its neutral position shown in Fig. 7. Thereafter, in the cycle of operation, the member 6 is moved inwardly, as by cam 7, on shaft 5 electrically to connect member 6 with the metal disc 8. During the continued rotation of shaft 5, one or the other of the cams 12, 12a returns the member 6 to its neutral position. The restoring cams are insulated from shaft 5 and are engaged respectively by the brushes RM, LM. As apparent from the description, the device forms a reversing switch for motor M4 and in addition to controlling the sense of rotation of the motor in accordance with the sense of unbalance of network N4 also provides that the duration of the control impulses is a function of the extent of unbalance of the network N4.

Figure 3:
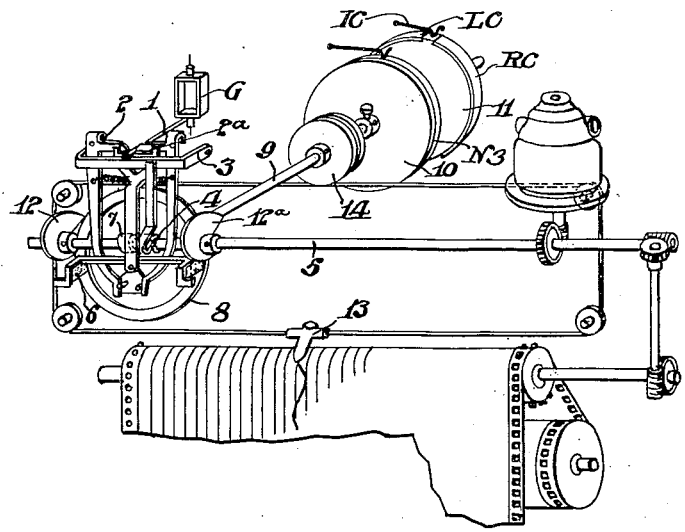

An alternative type of control apparatus for the master station, shown in Fig. 3, corresponds to that shown in the aforesaid Wunsch patent and its operation is, therefore, only briefly described. When the coil G, corresponding to the coil of galvanometer G4 of Fig. 2, deflects from neutral position, its pointer 1 passes beneath one or the other of the pivoted arms 2, 2a so that when the bar 3 is raised by cam 4 on the continuously rotating shaft 5, the arm is swung about its pivot to move the driving clutch member 6 from its neutral position. Thereafter, in the cycle of operation, the driving clutch member 6 is moved inwardly, as by cam 7, on shaft 5 to engage the driven clutch member 8 on whose shaft 9 are mounted two disks 10 carrying the slidewires N3 of the network N4 and also a disk 11 carrying the contacts RC and LC adapted selectively to engage the stationary contact IC. These three contacts constitute the reversing switch for the motor M4 of Fig. 2. During continued rotation of the shaft 5 one or the other of the cams 12, 12a returns the driving clutch member to its neutral position, and since it is in engagement with the driven clutch member 8 at this time the slidewire disk and control switch contacts are actuated. The changes in system frequency can be recorded by the same apparatus by connecting the marker 13, as by the cord and pulley system indicated, to the disk 14 on the controlled shaft 9.

It is not feasible in large systems to apply frequency control to a single generator because the burden of maintaining the system frequency is thus thrown on the controlled unit, and the alternator would have to be of prohibitively large capacity in order to maintain system frequency with the wide fluctuations of system load encountered in practical operation. Neither is it desirable to apply frequency control, such as shown in Fig. 2, to several units of a system since, without expert supervision, one or the other of them would eventually attempt to carry all the variations in load.

By applying frequency control to the central station and load-frequency control to the other units of the system, as suggested above and hereinafter more specifically explained, all of the stations quickly respond to changes of system frequency and share in restoring it to normal. Moreover, the load distribution between the stations is maintained at the desired value and without need for any conductors in addition to the tie lines between the stations.

Figure 4:
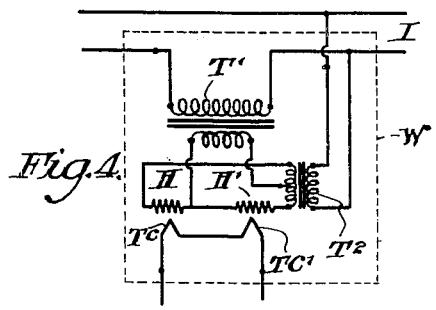

In Fig. 6 is shown a control arrangement to obtain load-frequency control typical of the control effected by the load frequency controllers FLC1—FLC11. In the tie line T extending from the alternator A toward the central station is included the device W which is responsive to the tie line load and which, in the particular arrangement shown, produces a direct current electromotive force whose magnitude is a function of the tie line load. The device W may be, as shown in Fig. 4, a thermal converter, comprising two transformers T1 and T2 whose primaries are connected, respectively, in series with and across the tie line conductors. The heaters H, H1 are connected in series with the secondary of the potential transformer T2, and the secondary of the current transformer T1 is connected from the midpoint of the secondary of the potential transformer to a point between the two heaters. The thermocouples TC, TC1 associated, respectively, with the heaters H and H1 are connected in series opposition. The direct current voltage across the output terminals of the converter varies with the tie line load and is utilized as hereinafter described.

Figure 5:
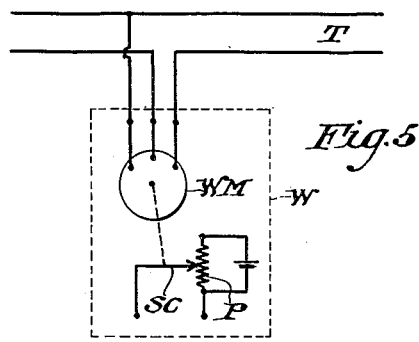
Fig. 5 is a modification of Fig. 4.

An alternative arrangement is shown in Fig. 5. The movable element of the wattmeter WM is connected to a slidewire contact Sc of a potentiometer P so that change in load varies the effective potentiometer voltage at the output terminals of the device.

Reverting to Fig. 6, the output terminals of the converter W are connected, respectively, to the contact 15 which is manually adjustable along the potentiometer resistance 16 to predetermine the desired tie line load, and the other output terminal of the load responsive device is connected to contact 17 for engagement by the movable contact 18 which is connected to the galvanometer G. When the tie line load is of the desired value, the output voltage of the device W is balanced by the effective voltage of the potentiometer 16 and the galvanometer G is in neutral position. When the tie line load is higher or lower than the desired value, the galvanometer G deflects to effect a change in setting of the governor C of the prime mover P. Specifically, the deflection of the galvanometer G is utilized to unbalance the frequency responsive network N so that galvanometer GN energizes the pilot motor M to change the governor setting in the proper sense to bring the tie line load to the desired value. A preferred mechanism for controlling the motor M in response to deflections of the galvanometer GN is shown in Fig. 7, whose construction and operation has been previously described herein.

When the network N is unbalanced, either by a change in system frequency or by the biasing control of the load-responsive device W, the galvanometer GN responds to change the governor setting, as above described.

The mechanism for unbalancing the network N in response to a deflection of galvanometer G is similar to that shown in Fig. 3. In brief, the deflection of the galvanometer G, through a mechanical relay mechanism, changes the position of the slidewires NS on the controlled shaft 9 with respect to their associated contacts (Fig. 8).

With the arrangement as thus far described, there is a tendency for the control system to hunt. To counteract this tendency additional mechanism is required. A suitable arrangement, shown in Fig. 6, comprises a double potentiometer AN which includes slidewire 19, mounted on the same controlled shaft 9 as the slidewires NS of frequency responsive network N, and a slidewire 20 which, concurrently with operation of switch 18, is mechanically coupled to shaft 9 for adjustment by the controller mechanism.

Referring to Figs. 8 and 9 for illustration of mechanism for effecting this intermittent adjustment of slidewire 20, the frame 21 which carries the resistance 20 is biased by the spring 22 so that normally the rim of the disk 23, movable with resistance 20, is out of engagement with the rim 24 of one of the slidewire disks on the shaft 9 of the biasing controller. Upon an extension 25 of the rockable frame 21 is mounted the gear 26 which is periodically stepped by the one-toothed gear 27 driven from shaft 5 through the gears 28, 29 and shaft 30. When the gear 26 has been stepped to such position that the high tooth 31 is engaged by the single tooth of gear 27, the frame 21 is rocked to effect mechanical coupling between the controlled shaft 9 and the resistance 20 so that deflection of galvanometer G is effective to adjust resistance 20 of network AN (Fig. 6) in such sense to rebalance it and cause return of the galvanometer G to zero position. As the frame 21 is rocked to the position shown in Fig. 8, the gear 26 presses against the roller 32 on the pivoted arm 33 to engage and move the member 34 to move the contact 18 out of engagement with contact 17, thus disconnecting the load-setter 16 and the tie-line load responsive device W, and into engagement with the contact 35 to connect the galvanometer G, through a suitably high resistance 36, directly between the adjustable contacts of resistances 19 and 20 of the network AN.

Assuming the contact 18 is in engagement with contact 17, the galvanometer G, in seeking to reduce the voltage impressed on its terminals, adjusts the contact on resistance 19 and therefore also effects adjustment of the slidewires NS of the frequency responsive network which are on the same shaft. The galvanometer GN, in response to adjustment of slidewires NS, changes the input to alternator A, causing the tie-line load to approach the desired or normal value. The control system may come to a temporary balance with, however, a difference of potential between the contacts of resistances 19 and 20 which is related to the difference between the actual and desired magnitudes of the tie-line load. This difference is reduced each time contact 20 is mechanically coupled to the control mechanism and contact 18 is in engagement with contact 35 with the result that each time the switch 18 is returned to engage contact 17, galvanometer G responds to a voltage related to the change in tie-line load which should be effected to return it to the desired value and effects further adjustment of slidewires NS to change the input to generator A and therefore the tie-line load.

Briefly, to review the control action, immediately upon a change in system frequency due, for example, to a change in system load or to change in the frequency controller at the central station, the network N of each station is unbalanced and its galvanometer GN responds to effect a change in input of the associated generating unit. As all of the units Nos. 1 to 3 and Nos. 5 to 11 are provided with a control system of the type shown in Fig. 6, all of the units immediately respond to the change in system frequency to pick up or drop load as required to restore frequency to normal. The several thermal converters W, or their equivalent, through the control arrangement above described, then operate to effect a slow change of the tie line loads so that eventually the system again comes to balance at normal or desired system frequency and with each of the stations effecting the desired interchange of power between itself and the system.

If, for any reason, the tie line load on any station changes without any change of system frequency, the device W of that station operates slowly to change the station input until the tie line load is restored to the desired value.

The control action is not impaired if the constants of the network N at any one or more of the stations change because, in effect, each network is recalibrated for balance at the system frequency each time the tie line load departs from the desired value. If the central station cannot hold the desired system frequency, or is not provided with frequency control, the control arrangement described enables all units temporarily to assist in supplying additional load thrown on the system and thereafter to restore the tie-line loads to their desired magnitudes.

As shown in Fig. 1, each of the load-responsive devices W1—W3, W5—W11 for controlling stations Nos. 1 to 3 and Nos. 5 to 11, respectively, are each disposed in the line extending from the station it controls toward the central station. Referring to station No. 10, for example, there are three tie-lines extending therefrom and several lines to outlying loads L. Only one of the tie-lines is effective for transfer of power to or from station No. 10 and the center of the system, and it is in this tie line that the load-responsive device W10 is located.

The control arrangement shown in Fig. 6a is an alternative which may be used instead of the arrangement of Fig. 6. In this modification, the galvanometer G varies the position of contact 15a relative to the potentiometer resistance 16a to maintain balance between the effective potentiometer voltage and the voltage produced by the device W which is a function of the tie line load. The slidewire 16a of the potentiometer is mechanically coupled to the slidewire NS of the frequency-responsive network N. The galvanometer GN, responsive to unbalance of network N, controls the motor M, preferably utilizing a control device such as shown in Fig. 7. The adjustable resistance 16a, controlled by galvanometer G, is also mechanically coupled to contacts Y and Z adapted selectively to be engaged by contact X when displaced from neutral position. Contacts X, Y and Z form a reversing switch for motor MM whose armature is suitably mechanically connected through a speed-reducing drive to the slidewire NS of the frequency-responsive network.

Assuming that the tie line load departs from the desired value, the galvanometer G deflects to readjust the potentiometer for balance at the new output voltage of device W; concurrently therewith it effects movement of slidewire NS to unbalance network N, whereupon galvanometer GN deflects to operate motor M and change the input to the alternator A in proper sense to restore the tie line load toward the desired value. The deflection of galvanometer G also changes the relative position of contacts Y and Z with respect to contact X. The motor MM is energized to move the slidewire NS slowly with respect to contact NSC and in such sense as to modify the unbalance of network N. The control system as a whole comes to rest when the input to the generating unit has been adjusted to such magnitude that the tie line load is again at the desired value at which time the contact X is again at neutral position. The tie line load can be set for different desired values by shifting contacts Y and Z to change the neutral position of contact X.

This modification, like that of Fig. 6, permits all of the generators, or generating stations, temporarily to assist in the maintenance of system frequency when a load change occurs anywhere in the system, provides for eventual restoration of the tie line load, or loads, to their desired value, and is characterized by freedom from hunting. In this modification also no error is introduced if any of the elements of the frequency-responsive networks N drift from their initial values since, in effect, each network N is recalibrated each time its controller, including galvanometer G operates, for balance at the system frequency which, as stated above, is primarily controlled by the central station. This feature also permits the instantaneous system frequency to be varied at the central station, to correct for time error, for example, because of the cooperation of the frequency-load controllers FLC at the other stations. It is again stressed that the control system does not require communication or pilot wires between stations.

A suitable mechanism for effecting adjustment of the various elements of the control arrangement of Fig. 6a is shown in Fig. 6b. The deflections of galvanometer G, by mechanical relay mechanism similar to that shown in Fig. 3 and described above, effect movement of shaft 9 to which are secured the discs 50, 51 and 52 carrying, respectively, the potentiometer slidewire 16a, the slidewire NS of the frequency-responsive network N, and contacts Y, Z of the reversing switch for motor MM. Contact NSC of slidewire NS is carried by gear 53 which is loosely mounted on shaft 9 and is driven by gear 54 connected to the armature of motor MM. Contact X is adjustable about the axis of disc 52 carrying the contacts Y, Z; as shown, it may be carried by a gear 55, freely rotatable on shaft 9, and in mesh with gear 56 rotatable by the knob 57 which is manually adjustable for setting of the desired tie-line load.

When there is more than one generating unit at a station, the station load may be distributed between them, as disclosed and claimed in Doyle Patent No. 1,918,021 or, alternatively, the system shown in Fig. 10 may be used. The control system for the alternator A is the same as in Figs. 6 or 6a and its description is not, therefore, repeated. In addition to the device W responsive to the tie-line load of the station, there are included in circuit with the individual leads from the alternators A, AB and AC the individual current or load-responsive devices WA, WB and WC which may be similar to the load-responsive device of Fig. 4 or Fig. 5. The device WA produces a voltage which is a function of the load carried by the master alternator AA, and against this voltage are balanced the voltages produced by the similar devices WB and WC. The galvanometer GB is responsive to any difference between the voltages produced, respectively, by the devices WA and WB, and is effective to operate the pilot motor MB to change the input of the alternator AB until the two voltages balance. This condition of balance obtains when the desired load ratio of the alternators A and AB is effected. The mechanism shown in Fig. 7 is suitable for control of motor MB by galvanometer GB. Similarly, the galvanometer GC responds to any difference between the voltages produced by the load-responsive devices WA and WC to change the input to the alternator AC until the desired load relations obtain. As thus far described, the system is similar to that shown in the aforesaid Doyle patent. In order that the generators AB and AC need not wait for alternator A to change load, before they start to change load, there is included in the circuit between the master responsive device WA and the individual control branches of the circuit the network N2 which comprises the resistance R on the discharge side of condenser K and resistance R1 on the discharge side of condenser K1. One or the other of these condensers is charged concurrently with energization of motor M of the master unit, the condenser K receiving a charge when the motor M is energized for rotation in one direction and condenser K1 receiving a charge when the motor is energized for rotation in reverse direction. The switches for selective charging of the condensers may simply be additional contacts on the galvanometer-controlled reversing switch for the motor M or, as indicated, the switches KS, KS1 may be operated by the relay coils KR, KR1. Therefore, when the motor M receives an impulse to raise the governor setting of prime mover P connected to generator A, condenser K receives a greater or lesser charge depending upon how far the network N of the frequency controller is off balance. The resistance R2 holds back the charge for several seconds, and even after the switch KS is opened. The discharge current passing through the resistance R introduces into the control network for the alternators AB and AC a voltage which causes the galvanometers GB and GC to respond and energize the pilot motors MB, MC to raise the governor settings. By the time the pointers of the galvanometers GB and GC are again clamped, the charge of the condenser K has been practically dissipated so that for every impulse sent to the motor M, the pilot motors MB and MC will receive an impulse so that the governor settings of all three machines are concurrently changed. The condenser K¹, switch KS¹ and resistances R3 and R⁴ function in similar manner and cause the pilot motors MB and MC to lower the governor setting concurrently with lowering of the setting of pilot motor M. As a result of the operation of this control the three generators approach and arrive at their new governor settings substantially simultaneously, therefore avoiding load swings between the generators.

With the arrangement shown in Fig. 10, it is possible that the frequency may be high, for example, requiring reduction of the inputs to generators AB and AC, yet at the same time the load distribution between these generators and generator A may be such that the input to one or both of them should be decreased. By incorporating into Fig. 10 the selective relay system of Fig. 10a, now described, the load distributing control is rendered ineffective when its requirements are opposite to those of the frequency control.

Referring to Fig. 10a, it is assumed that the system frequency is low and that the frequency-controller has energized the winding $r$ of motor M to raise the input to alternator A. Concurrently, there is established a circuit including contacts 54 and 55 of relay coil RF which thereupon moves contacts 55 to 58 to the position shown in Fig. 10. Engagement of contact 55 with contact 59 completes a hold-in circuit for the relay coil RF. Contacts 57 and 58 effect connections from the "raise" fields $r$ of motors MB and MC to the "raise" contacts of the galvanometers GB and GC so that these motors may be controlled to raise the inputs to alternators AB and AC. At this time, relay coil LF is deenergized and movable contacts 60 to 63 are in the position shown in Fig. 10a. As there shown, the contacts 62 and 63 are open, interrupting the circuits from the "lower" fields of motors MB and MC so that if either or both of galvanometers GB, GC close their "lower" contacts, no change of input to alternators AB and/or AC occurs. As indicated in Fig. 10a, all of the movable contacts may be mechanically connected for movement in unison to the right when coil RF is energized and to the left when coil LF is energized. Other suitable equivalent arrangements may, of course, be used.

Conversely, when the system frequency is high, the galvanometers GB and GC are ineffective to decrease the input to either or both of alternators AB and AC. Specifically, when the frequency controller closes the circuit of the "lower" field $l$ of motor M, it concurrently completes a circuit through the contacts 60, 64 and relay coil LF. The contacts 60 to 63 are thereupon moved from the position shown in Fig. 10a; contact 60 engages contact 65 to complete a hold-in circuit which includes contacts 56 and 66 of relay coil RF; contact 61 separates from contact 67 to interrupt the hold-in circuit for relay coil RF; and contacts 62 and 63 close to connect the "lower" field coil $l$ of motors MB and MC to the "lower" contacts of the galvanometers GB and GC. At this time relay coil RF is deenergized to interrupt the circuits from the "raise" fields of motors MB and MC.

Briefly, therefore, the galvanometers GB and GC are effective either to raise or to lower the inputs to the generators AB and AC to obtain the desired proportioning of load. However, if the system frequency is high, the galvanometers GB and GC are effective to lower the inputs to proportion the group load but cannot increase them, and if the system frequency is low, the galvanometers GB and GC are effective to increase the inputs to proportion group load but cannot decrease them. Otherwise stated, the load proportioning control is effective except when its requirement is opposite to that of the frequency control.

The control arrangement shown in Fig. 11 may be employed at any one or more stations #1-3 or #5-11 instead of the systems shown in Fig. 6 or 6a. In common with the systems of Fig. 6 and Fig. 6a, it includes a network N, responsive to frequency, and whose unbalance is detected by a galvanometer GN which operates the pilot motor M to change the setting of governor C in proper sense towards restoration of system frequency.

The load-biasing control, however, is somewhat different than shown in Figs. 6 and 6a. The slide-wires NS, NS of the frequency bridge are mechanically coupled through suitable reduction gearing to a reversible motor MB which is controlled by the galvanometer G responsive to unbalance between the load setter 16 and the tie line load-responsive device W. When the tie line load is not of the desired value, the galvanometer G deflects in corresponding direction to effect energization of the motor MB to change the setting of the slidewires NS, NS of the frequency bridge N, the unbalance effected thereby being in such sense that the galvanometer GN controls the pilot motor M in proper direction to cause the input to the alternator A to change in proper sense to restore the tie line load to desired value. As with the control systems of Figs. 6 and 6a, a change in system frequency results in a rapid change of the station input, and a change in tie-line load results in a slow change of station input. At any given time, either or both control actions may occur.

The system shown in Fig. 11 also includes an arrangement which precludes change of the governor setting when the requirements of frequency and tie line load are opposite. For example, it is assumed that the system frequency is low, thus calling for further opening of the governor controlled valve, and that the tie line load, as measured by the device W, is high requiring a reduction of input to the alternator A. Under this circumstance, the movable contact operated by the galvanometer G engages the contact LB which would otherwise result in lowering of the setting of governors C, and the movable contact operated by the frequency responsive galvanometer GN would engage contact RM ordinarily resulting in raising of the setting of the governor C. However, there is included in circuit with contact RM a switch BL which is operated concurrently with closure of the switch LB to interrupt the circuit including motor M and contact RM; switch BL may simply be an additional contact on switch LB or, as shown, it may be operated by the relay coil BLC. Similarly, when the tie line load is low, and the system frequency high, the switch BR precludes operation of motor M. The switches BR and BL are normally closed, and so do not interfere with response of the control system to change of either tie line load and/or frequency, except when, as above stated, the demands of frequency and tie line load are opposite in their control requirements.

My invention is not limited to interconnected systems of the type shown in Fig. 1, but is also applicable to interconnected systems in which the tie lines form loops, as shown in Fig. 12. In this figure the stations #12, 14, 17, 18 and 20 may be controlled in exactly the same manner as any of the stations 1–3 and 5–11 of Fig. 1. The stations 13, 16 and 19, however, have more than one tie line extending directly or indirectly towards the central station 15 and so, at first hand, it would appear that the control might be different. However, it is only necessary to control these stations in accordance with the algebraic sum of their tie line loads towards the central station. Considering, for example, station 13 and referring to Fig. 13, instead of only one tie line load responsive device between tie line load device W and the load setter 16 (as in Fig. 6) there is included in series three of the tie line load receiving devices W, and the algebraic sum of their output voltages are balanced against the effective voltage of the load setter 16. The control of stations 16 and 19 is similar.

In the preceding modifications, the primary control is in response to a change in system frequency and the ultimate control is to establish or maintain a desired interchange of power, or current, between the system and the individual generating units. In some instances, it is desirable that the primary control of one or more units be effected in response to a change in load, particularly for large abrupt changes and that the ultimate control be in response to frequency.

Referring to Fig. 14, so long as the exchange of power between the generator AD and the system is of the desired magnitude, the force exerted by spring 70 is balanced by the force due to the coils of wattmeter WD. When, however, the power exchange is lower or higher the forces are unbalanced and the contact 71 is moved to engage one or the other of contacts 71, 73 to effect operation of motor MD thereby to change the input to prime mover PD as by changing the bias of governor CD or directly operating the input valve. Concurrently with energization of motor MD, the motor WM is energized to change the force exerted by spring 70 and move contact 71 out of engagement with contact 72 or 73. The greater the departure in load, the longer the motor MD is energized and the greater the change in the governor setting and conversely, the smaller the departure in load, the smaller the change in the governor setting.

Preferably, the spacing between contacts 72 and 73 is sufficiently great to permit the power exchange to vary through a suitable range, as, for example, five per cent higher or lower than normal, without effecting engagement of contact 71 with contact 72 or 73.

Within this range, the setting of the governor is determined by the frequency controller FD or equivalent. When the frequency is higher or lower than the desired magnitude, the galvanometer GD effects intermittent engagement between contact 74 and one or the other of contacts 75, 76 to energize motor MD in proper sense to change the alternator input for return of the frequency toward normal. The mechanism shown in Fig. 7 is suitable for operating the contacts in accordance with deflections of the galvanometer upon change in frequency. Motor WM is not energized in response to a change in system frequency because its circuit is opened by contacts 77, 77 of relay 78 which is energized whenever contact 74 of the frequency controller engages either of contacts 75, 76.

For small sudden changes in load, or for large slow changes thereof, the departure of frequency from normal is small and the frequency controller regulates the governor setting. For sudden large changes, the wattmeter WD responds as above described to energize both motors WM and MD and, in addition, by relay 80 and contact 81, it disables the frequency controller. Interruption of the frequency control circuit by opening of relay contact 81 effects de-energization of relay 78 whereupon contacts 77, 77 close to allow control of motor WM by the quick-acting wattmeter WD.

When the tension of spring 70 has been changed sufficiently at the new load value to move contact 71 out of engagement with contact 72 or 73, both motors are de-energized, and relay 81 is de-energized to reestablish the frequency control circuit allowing the frequency-controller FD to resume control.

The control system of Fig. 14 or its equivalent is particularly suited for control of the central station of the system of Fig. 1 or of Fig. 12 when the area supplied by that station contains widely varying loads of large magnitudes, since it permits the central station to take such fluctuations of load without reliance upon the other stations for temporary assistance.

The system of Fig. 14 may also be used in a system such as shown in Fig. 1 or Fig. 12 for an outlying station by providing a tie-line load responsive device, as in Figs. 6 or 6a, for example, to readjust the calibration of the frequency-controller FD.

The control system of Fig. 14 may also to advantage be applied to an isolated station subject to abrupt variations of its load which are so large, considering the capacity of the station or unit, that large frequency variations would otherwise result. For large sudden changes in load, the load controller of Fig. 14 anticipates the large change in frequency that would otherwise occur and rapidly applies a substantially correct adjustment and then permits the frequency controller to make the ultimate small adjustment. When the control system is so used, the output system of the unit is constituted by its load L which is connected so that the load current traverses the current coils of wattmeter WD.

The methods performed by the systems described can be performed by operators in accordance with observations of suitable measuring instruments. However, as practically continuous supervision would in most cases be necessary, it is preferable to use our automatic controls, as specifically described, or their equivalent.

While we have illustrated and described satisfactory specific control arrangements and methods, it is to be understood our invention is not limited thereto but is coextensive in scope with the appended claims.

What we claim is:

1. In a system for supplying alternating current comprising generator stations interconnected by one or more tie lines, the method of operation which comprises, upon a change of system frequency, substantially immediately and simultaneously changing the power inputs at the stations to cause them to share in and rapidly effect return of system frequency toward normal, and more slowly changing the power input at one or more stations ultimately to return its tie line load to predetermined magnitude.

2. In a system for supplying alternating current comprising generating stations interconnected by one or more tie lines and including a central station, the method of operation which comprises, upon a change in system frequency, substantially immediately and simultaneously changing the power inputs at the stations to cause them to share in and rapidly effect restoration of system frequency, and more slowly changing the power input at the station or stations, except the central station, to return the tie line load to predetermined magnitude.

3. In a system for supplying alternating current comprising a plurality of generating stations interconnected by one or more tie lines and including a central station, the method of operation which comprises, upon a change in system frequency, substantially immediately and simultaneously changing the power inputs to the stations to cause them to share in rapidly effecting restoration of system frequency, and more slowly changing the power input at each of the stations, except the central station, to return the load of the tie line or tie lines extending therefrom toward the central station, to predetermined magnitude.

4. In a system for distributing current comprising a plurality of generating stations connected into the system by one or more tie lines, the method of operation which comprises varying the inputs at all of the stations substantially immediately and simultaneously upon change in demand upon any of the stations by an individual load circuit, and more slowly changing the input at one or more of said stations to reestablish predetermined magnitudes of the tie line loads.

5. In a system for distributing alternating current comprising a plurality of generating stations having individual load circuits and interconnected by tie lines, the method of operation which comprises controlling the inputs at each of said stations in accordance with unbalance of a network normally balanced at the desired system frequency and responsive to departure therefrom, and upon departure of the tie line load of any one or more of said stations from a predetermined magnitude slowly changing the calibration of the control network of said station.

6. In a system for supplying alternating current comprising a plurality of generating stations interconnected by tie lines, the method of operation which comprises rapidly changing the inputs at said stations upon occurrence of a change in system frequency, and superimposing upon the frequency control of the input of each of said stations a slower control action in accordance with departure of its tie line load from a predetermined magnitude.

7. In a system for supplying alternating current comprising a plurality of generating stations interconnected by tie lines, the method of operation which comprises producing at each of said stations an effect whose magnitude is a function of the departure of system frequency from normal, producing at each of said stations an effect whose magnitude is a function of the departure of its tie line load from normal, slowly varying the magnitude of said first effect at each station in accordance with the magnitude of the second effect individual to that station, and varying the inputs at said stations each in accordance with the magnitude of the modified first effect individual thereto.

8. A system for supplying alternating current comprising a plurality of stations interconnected by tie lines, means at each of said stations responsive to changes in system frequency, means at each of said stations responsive to changes of its tie-line load, and means at each of said stations controlled by said first responsive means to effect a rapid change of station input and by said second responsive means to effect a slower change of station input.

9. A system for supplying alternating current comprising a plurality of stations interconnected by tie lines, a normally balanced control network at each of said stations, means at each of said stations responsive to unbalance of said network to vary the station input, means included in each of said networks to unbalance it upon departure of system frequency from normal, and means included in each of said networks for slowly unbalancing it upon departure from normal of the tie line load of the associated station.

10. A system for supplying alternating current comprising a plurality of generating stations, including a central station, interconnected by tie lines, means at each of said stations for automatically varying the input upon change in system frequency, and means at each of said stations, except said central station, for automatically varying its input to maintain substantially constant the load of the one or more tie lines extending therefrom toward said central station.

11. A system for supplying alternating current comprising a plurality of generating stations, including a central station, interconnected by tie lines; a normally balanced control system at each of said stations, means at each of said stations responsive to unbalance of the control system to vary the station input, means at each of said stations for unbalancing the control system therefor upon departure of system frequency from normal, and means at each of said stations, except said central station, for unbalancing the control system upon departure from normal of the load of the one or more tie lines extending therefrom toward the central station.

12. In a system for supplying alternating current, a generating unit, a normally balanced control network including means for unbalancing it upon departure of system frequency from normal, a second normally balanced control network including means for unbalancing it upon departure of load from a predetermined magnitude, means responsive to unbalance of one of said networks to vary the input to said unit, means responsive to unbalance of the other of said networks to unbalance said one of said networks by adjustment of impedance thereof to effect variation of the input to said unit, a third balanceable network including impedance adjusted to unbalance said third network concurrently with said adjustment of impedance of said one of said networks, and means for intermittently preventing operation of said second responsive means by said other of said networks to effect a rebalancing adjustment of said third network.

13. In a system for supplying alternating current, a generating unit, a normally balanced control network including means for unbalancing it upon departure of system frequency from normal, a second normally balanced control network including means for unbalancing it upon departure of load from a predetermined magnitude, means responsive to unbalance of one of said networks to vary the input to said unit, means responsive to unbalance of the other of said networks to unbalance said one of said networks by adjustment of impedance therein, and means intermittently effecting a reverse adjustment of impedance of said one of said networks.

14. In a system for supplying alternating current, a generating unit, a normally balanced control network including means for unbalancing it upon departure of system frequency from normal, a second normally balanced control network including means for unbalancing it upon departure of load from a predetermined magnitude, means responsive to unbalance of said first network to vary the input to said unit, means responsive to unbalance of said second network to unbalance said first network by adjustment of impedance therein, a third network unbalanced by said second responsive means concurrently with unbalancing of said second network, and means for intermittently effecting operation of said second responsive means by said third network to the exclusion of said second network to effect a further adjustment of the impedance of said first network.

15. In a system for supplying current comprising two or more generating units, means responsive to change of the individual load of one of said units to vary the inputs to the other of said units to maintain a predetermined relation of the loads of said units, and means responsive to a system condition for varying the input of said one of said units and for effecting a change in the inputs of the other of said units to anticipate response to said first responsive means.

16. In a system for supplying alternating current comprising two or more generating units, means responsive to change of the individual load of one of said units to vary the inputs to the other of said units to maintain a predetermined relation of the loads of said units, and means responsive to change of system frequency for varying the input of said one of said units and for effecting a change in the inputs of the other of said units to anticipate response of said first responsive means.

17. In a system for supplying current, comprising two or more generating units, means responsive to change of the individual load of one of said units to change the inputs to the other of said units to maintain a predetermined relation of the loads of said units, and means responsive to the interchange of power between the system and said units as a group for varying the input to said one of said units and for effecting a change in the inputs of the other of said units to anticipate response of said first responsive means.

18. In a system for supplying alternating current, comprising two or more generating units, means responsive to change of the individual load of one of said units to change the inputs of the other of said units to maintain a predetermined relation of the loads of said units, and means responsive to the system frequency and to the interchange of power between the system and said units as a group for varying the input to said one of said units and for effecting a change in the inputs of the other of said units to anticipate response of said first responsive means.

19. In a system for supplying current comprising two or more generating units, a normally balanced control system including means responsive to change in load of one of said units to unbalance said system, means responsive to unbalance of said control system to effect change in the inputs of the other of said units to restore the desired load relations of said units, and means responsive to change of an operating condition for varying the input of said one of said units and for unbalancing said cointrol system independently of said first responsive means.

20. In a system for supplying current comprising two or more generating units including a master unit, each having means adjustable to vary the inputs therefor, a control circuit including means for producing voltages of magnitudes determined by the individual loads of said units, means responsive to unbalance of said voltages for effecting actuation of said input adjusting means except the input adjusting means of said master unit, and means operated concurrently with operation of the input adjusting means of said master unit for producing a voltage in said control circuit.

21. A control system comprising a master unit and one or more other units, each of said units having means adjustable to vary the operating condition thereof, a control network including means for producing voltages of magnitudes determined by the conditions of operation of said units, means responsive to unbalance of said voltages to effect adjustment of said adjustable means of said one or more other units, and means operated concurrently with adjustment of the adjustable means of said master unit for producing a voltage in said control network to unbalance it.

22. In an alternating current system including a generating unit, the method of control which comprises producing a control effect whose magnitude is varied as a function of the change of system frequency, producing a control effect whose magnitude is varied as a function of power exchange, and rapidly varying the input to said unit in accordance with one of said control effects, and more slowly varying the input in accordance with the other of said effects.

23. In an alternating current system including a generating unit, the method of control which comprises producing a control effect whose magnitude is varied as a function of the change of system frequency, producing a control effect whose magnitude is varied as a function of the amount of power transferred between said unit and the system, rapidly varying the input to said unit in accordance with one of said control effects for large sudden changes in the amount of power exchanged between the unit and the system, and more slowly varying the input to said unit in accordance with the other of said control effects for small, or slow large, changes in the amount of power exchanged.

24. In an alternating current system including a generating unit, the method of control which comprises controlling the input to said unit in accordance with system frequency so long as the amount of power exchanged between said unit and the system is less than a predetermined magnitude, and rapidly varying the input to said unit in accordance with the amount of power exchanged when the power exchanged is in excess of said predetermined magnitude.

25. In an alternating current system including a generating unit, the method of control which comprises rapidly changing the input to said unit for large sudden changes in the amount of power exchanged between said system and the unit, and thereafter more slowly changing the input to said unit in accordance with the deviation of the system frequency from the desired magnitude.

26. In an alternating current system, including a generating unit, the method of control which comprises controlling the input to said unit in accordance with system frequency so long as and when the amount of power exchanged between said unit and the system is within predetermined limits, and rapidly varying the input to said unit when the magnitude of power exchanged is outside of said limits.

27. In an alternating current system including a generating unit, the method of control which comprises upon departure of system frequency from normal rapidly varying the input to said unit in proper sense to restore system frequency, and more slowly varying the input to said unit ultimately to establish a predetermined exchange of power between said unit and the system.

28. In an alternating current system comprising a generating unit, means responsive to departure of the system frequency from normal, means responsive to variation in the power exchange, and means adjustable to vary the input to said unit operated rapidly by one of said responsive means and more slowly by the other of said responsive means.

29. In an alternating current system comprising a generating unit, means responsive to departure of the system frequency from normal, means responsive to variation in magnitude of the power exchanged between said unit, and means adjustable to vary the input to said unit operated rapidly by said frequency responsive means and more slowly by said load responsive means.

30. In an alternating current system comprising a generating unit, means responsive to departure of the system frequency from normal, means responsive to variation in magnitude of the power exchanged between said unit, and means adjustable to vary the input to said unit operated rapidly by said load responsive means and more slowly by said frequency responsive means.

31. In an alternating current system comprising a generating unit, means responsive to departure of the system frequency from normal, means responsive to variation in magnitude of the power exchange of said unit, and means adjustable to vary the input to said unit operated by said first responsive means for small, or large slow changes of power exchange, and operated by said second responsive means for large sudden changes of power exchange.

32. In an alternating current system comprising a generating unit, normally balanced means responsive to departure of the system frequency from normal, normally balanced means responsive to variations in magnitude of the power exchanged between said unit and the system, and means adjustable to vary the input to said unit operated by one of said means upon unbalance thereof rapidly to restore balance thereof and operated upon unbalance of the other of said means more slowly to effect rebalance thereof.

33. In an alternating current system comprising a generating unit, normally balanced means responsive to departure of the system frequency from normal, normally balanced means responsive to variations in magnitude of the power exchanged between said unit and the system, and means adjustable to vary the input to said unit operated upon unbalance of said frequency responsive means rapidly to restore balance thereof, and operated upon unbalance of said load responsive means more slowly to restore balance thereof.

34. In an alternating current system comprising a generating unit, normally balanced means responsive to departure of the system frequency from normal, normally balanced means responsive to variations in magnitude of the power exchanged between said unit and the system, and means adjustable to vary the input to said unit operated upon unbalance of said load responsive means rapidly to restore balance thereof, and operated upon unbalance of said frequency responsive means more slowly to restore balance thereof.

35. A system for supplying alternating current comprising a plurality of generating stations, including a central station, interconnected by tie lines, means at each of said stations for automatically varying its input upon change in system frequency, means at each of said stations, except the central station, for automatically varying its input to maintain substantially constant the load of the one or more tie lines extending therefrom toward said central station, and means responsive to large changes in magnitude of the load individual to the central station for controlling its input and for temporarily taking precedence over the frequency control means individual thereto.

36. In a system for supplying alternating current comprising generating stations interconnected by one or more tie lines, the method of operation which comprises upon a change in system frequency or system load, substantially immediately and simultaneously changing the power inputs at the stations in proper sense to effect rapid return of system frequency toward normal, and thereafter more slowly changing the power input at one or more stations to return the tie-line loads to normal.

37. An arrangement for supplying the load of an electrical system comprising a plurality of generator stations, tie lines interconnecting said stations, means at said stations responsive to change in system load for varying the station inputs temporarily to distribute the load change between stations through the tie lines, and means at said stations responsive to tie-line load eventually to restore tie-line load irrespective of said change in system load.

38. A system for supplying alternating current comprising a plurality of generator stations interconnected by tie lines, means at each of said stations responsive to changes in system frequency, means at each of said stations responsive to changes of its tie-line load, means at each of said stations for varying the station input controlled by said frequency-responsive means and said tie-line load responsive means, and means at each of said stations for precluding operation of said input-varying means when the concurrent demands of said frequency-responsive means and said tie-line load responsive means upon said input-varying means are opposite in sense.

39. A control arrangement for a generator station comprising means responsive to the load of the electrical system including said station, means responsive to the changes in magnitude of the tie-line load of said station, means for varying the input at said station controlled by said system-load responsive means and said tie-line load responsive means, and means precluding operation of said input-varying means when the concurrent demands of said two responsive means upon said input-varying means are opposite in sense.

ALBERT J. WILLIAMS, Jr.
STEPHEN B. MOREHOUSE.